(12) United States Patent
Landon et al.

(10) Patent No.: US 10,560,254 B1
(45) Date of Patent: Feb. 11, 2020

(54) PICOSECOND LPD TIME ALIGNMENT

(71) Applicant: L3 Technologies, Inc., New York, NY (US)

(72) Inventors: David G. Landon, Bountiful, UT (US); Radivoje Zarubica, Salt Lake City, UT (US)

(73) Assignee: L3 Technologies Inc., New York, NY (US)

( * ) Notice: Subject to any disclaimer, the term of this patent is extended or adjusted under 35 U.S.C. 154(b) by 0 days.

(21) Appl. No.: 16/000,354

(22) Filed: Jun. 5, 2018

Related U.S. Application Data

(60) Provisional application No. 62/545,891, filed on Aug. 15, 2017.

(51) Int. Cl.
| | |
|---|---|
| *H04L 7/00* | (2006.01) |
| *H04L 7/033* | (2006.01) |
| *H04L 7/04* | (2006.01) |
| *H04L 1/00* | (2006.01) |

(52) U.S. Cl.
CPC .......... *H04L 7/0331* (2013.01); *H04L 7/0029* (2013.01); *H04L 7/042* (2013.01); *H04L 1/0039* (2013.01)

(58) Field of Classification Search
CPC ..... H04L 7/0331; H04L 7/0029; H04L 7/042; H04L 1/0039
USPC .......................................................... 375/376
See application file for complete search history.

(56) References Cited

U.S. PATENT DOCUMENTS

| | | | | |
|---|---|---|---|---|
| 5,271,034 A | * | 12/1993 | Abaunza | G01S 19/243 342/357.62 |
| 5,596,332 A | * | 1/1997 | Coles | G01S 5/0009 342/455 |
| 6,239,743 B1 | * | 5/2001 | Lennen | G01S 19/215 342/357.63 |
| 6,359,926 B1 | * | 3/2002 | Isaksson | H04L 1/0025 375/219 |
| 6,674,876 B1 | * | 1/2004 | Hannigan | G06T 1/0028 375/E7.089 |
| 7,260,160 B1 | * | 8/2007 | Lennen | G01S 19/24 342/357.63 |
| 2004/0071221 A1 | * | 4/2004 | Nakada | H04L 27/2662 375/260 |
| 2005/0286653 A1 | * | 12/2005 | Lai | H04L 27/0008 375/308 |

(Continued)

*Primary Examiner* — Michael R Neff
(74) *Attorney, Agent, or Firm* — Workman Nydegger

(57) ABSTRACT

The application is generally directed to transmitting and receiving signals in a fashion that can mask the presence of the signals by including timing information in the signals using artifacts in a carrier signal. For example, one embodiment includes a method of transmitting a signal in a way to mask the presence of the signal or to reduce the ability of external entities to extract data from the signal. The method includes accessing a data signal. A phase of the data signal is correlated to a phase of a substantially continuous carrier signal carrying the data signal. The substantially continuous carrier signal carrying the data signal with the phase of the data signal correlated to the phase of the substantially continuous carrier signal is transmitted to a receiver, such that the data signal can be extracted by using phase correlation between the data signal and the substantially continuous carrier signal.

20 Claims, 7 Drawing Sheets

(56) References Cited

U.S. PATENT DOCUMENTS

| | | | |
|---|---|---|---|
| 2007/0071454 A1* | 3/2007 | Liu | H04B 10/505 398/183 |
| 2008/0001819 A1* | 1/2008 | Cohen | H04B 7/1853 342/357.44 |
| 2010/0210206 A1* | 8/2010 | Young | G01S 19/30 455/13.4 |
| 2018/0219645 A1* | 8/2018 | Giraldo | H04J 14/0227 |

* cited by examiner

PICOSECOND LPD TIME ALIGNMENT

CROSS-REFERENCE TO RELATED APPLICATIONS

This application claims the benefit of and priority to U.S. Provisional Patent Application Ser. No. 62/545,891 filed on Aug. 15, 2017 and entitled "Picosecond LPD Time Alignment," which application is expressly incorporated herein by reference in its entirety.

BACKGROUND

Background and Relevant Art

Recent work in picosecond internode timing alignment has enabled a number of N-radio collaborative coherent beamfocusing (CCB) efforts. These techniques have been shown to provide $N^3$ power gain for range extension, improved battery life, or improved covert operation. But, the methods used introduce a key vulnerability, undermining covertness by the use of a bursted, high Signal to Noise Ratio (SNR) side-channel for precise time alignment. Adversaries can readily detect and attack emitters of high-SNR signals—especially signals accentuated by abruptly switching on and off. Such attacks by adversaries may include jamming attacks, data interception attacks, or even physical attacks attempting to physically destroy such transmitters.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The application is generally directed to transmitting and receiving signals in a fashion that can mask the presence of the signals by including timing information in the signals using artifacts in a carrier signal. For example, one embodiment includes a method of transmitting a signal in a way to mask the presence of the signal or to reduce the ability of external entities to extract data from the signal. The method includes accessing a data signal. A phase of the data signal is correlated to a phase of a substantially continuous carrier signal carrying the data signal. The substantially continuous carrier signal carrying the data signal with the phase of the data signal correlated to the phase of the substantially continuous carrier signal is transmitted to a receiver, such that the data signal can be extracted by using phase correlation between the data signal and the substantially continuous carrier signal.

In another embodiment, another method of transmitting a signal in way to mask the presence of the signal or to reduce the ability of external entities to extract data from the signal is illustrated. The method includes accessing a communication payload data signal. The method further includes correlating a phase of the communication payload data signal to a phase of a carrier signal carrying the communication payload data signal, thereby adding timing information to the existing carrier signal carrying the communication payload data signal.

Yet another embodiment includes a method of extracting time alignment from a received signal. The method includes receiving a signal. The method further includes accommodating an artifact added to the signal at a transmitter to correlate a data stream in the signal with a carrier of the signal. The method further includes correlating the accommodated artifact to a reference signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
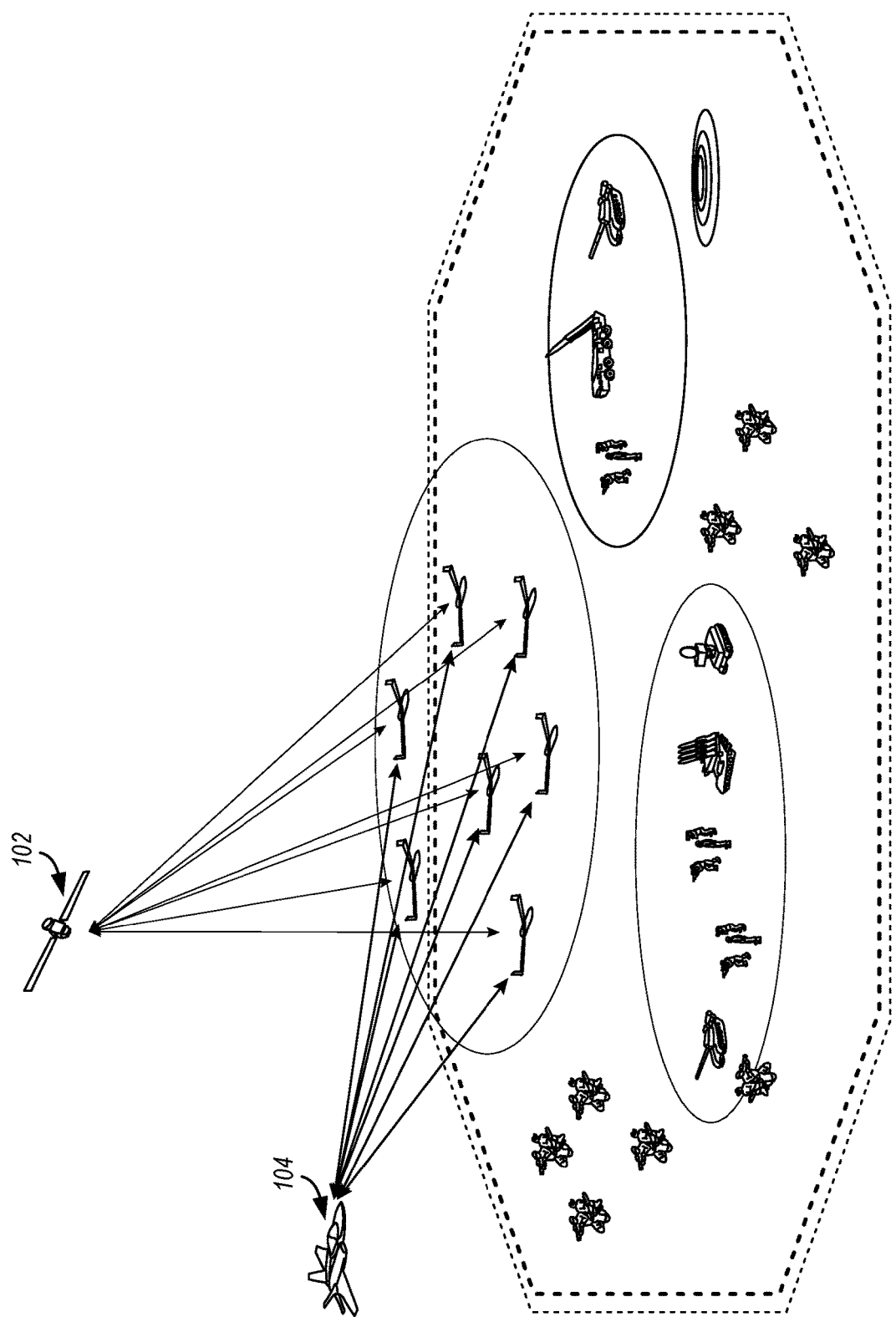
FIG. 1 illustrates a battlefield scenario showing a number of entities that may be associated with RF transmitters.

Embodiments illustrated herein can overcome some of the weaknesses of previous systems by extracting time synchronization from a continuous, low probability of detection (LPD) waveform already in use for covert communications, without the need for a side channel. The time synchronization illustrated herein is, in some embodiments, comparable in usefulness to time synchronization included in a dedicated (but very detectable) side channel dedicated to conveying time synchronization information. In particular, time synchronization often includes the use of side channel conveying timing information, such as sync words, or other timing signals. These side channels typically have bursted data, such that side channel transmitters can be easily detected and targeted. For example, as illustrated in FIG. 1, entities, such as operators, heavy machines, and aircraft all transmit signals to communicate with each other. If the signals can be detected, and their point of origin located, this can result in vulnerabilities of the entities to physical and/or other attacks. Thus, embodiments herein are able to use existing, substantially, continuous data signals to correlate a phase of these data signals to a phase of a carrier signal to add timing information to the data signals and carrier signals.

Note that in some embodiments, a signal waveform may be substantially continuous according to some predetermined threshold. For example, the threshold may define a percentage of continuity. For example an active signal may be required to have 90% (or some other percentage) of the signal that is continuously transmitting without interruption to be considered substantially continuous. Alternatively or additionally, an active signal may be required to be actively modulated, on average, for 90% (or some other percentage) of the time, without a limit on time between interruptions, for the signal to be considered substantially continuous. Alternatively or additionally, embodiments may require the signal to be able to fulfill some sort of function for the signal to be considered substantially continuous. For example, embodiments may require a certain power factor, a certain ability to continuously drive other circuits, a certain ability to continuously charge other circuits, or other continuity based ability to be considered substantially continuous. Alternatively or additionally, a signal may be considered to be substantially continuous based on the lack of detectability of interruptions in the signal. In particular, embodiments may require the signal to be undetectable as a data signal by external entities. While various percentages and functions have been illustrated in the examples of continuity characteristics used to determine if a signal is substantially continuous, it should be appreciated that other percentages, or other continuity characteristics may be used to determine that the signal is substantially continuous.

As will be illustrated below, in some embodiments, after coarse alignment from a chip tracking loop (to, e.g., within 5% of chip time), embodiments use complex correlation to a find phase offset relative to a Tx reference signal with a carrier frequency locked to chip timing. Some such embodiments achieve better than $1/(100 \times f_c)$ (where $f_c$ is the chip frequency) accuracy or, for example, 10 ps for a 1 GHz carrier. Note that a chip is a pulse (typically substantially rectangular) of direct-sequence spread spectrum (DSSS) code.

Some examples of complex correlation that may be used are described in U.S. Pat. No. 9,219,600 titled Synchronization Through Waveform Correlation issued on Dec. 22, 2015, which is incorporated herein by reference in its entirety.

Sub carrier cycle alignment allows for coherent cooperative use of spectrum over separate platforms, such as coherent jamming or coherent communications from a swarm of low size weight and power (SWAP) platforms.

Past solutions approaching this accuracy have used a bursted, high signal to noise ratio (SNR) side channel. This causes the side channels to be highly detectable and thus easily targeted by adversaries. In particular, these side channel signals can be visualized as a periodic power spike, which is easily detectable by monitoring radio signals. The source of the side channel signals can be quickly pinpointed and attacked. Thus, for example, each of the entities illustrated in FIG. 1 could become vulnerable to attack if using a bursted side channel.

In contrast, embodiments herein instead adapt a waveform, such as a continuous DSSS waveform to achieve the same accuracy in a very covert way. While the adapted waveform could be a substantially continuous side channel waveform created explicitly for the purpose of complex correlation, in other embodiments, the adapted waveform may be the carrier waveform for the data signal to be correlated. Embodiments can function at much lower (e.g., about 30 dB lower) SNR, and add no detection vulnerability to platforms. Additionally, as discussed above, some embodiments can be implemented in this way to obviate the need for a side channel dedicated to timing signals. That is, embodiments can be implemented with no added bandwidth beyond the existing communication channel.

In some embodiments, this is accomplished by a system with enhanced links including: direct-RF sampling and synthesis, phase/chip timing alignment (e.g., via a numerically controlled oscillator (NCO) reset operation at transmit (Tx) to cause a phase shift discontinuity and a corresponding phase shift correction to correct the discontinuity at receive (Rx)), and a fine correlation (e.g., a correlation of NCO shifted and accumulated chips).

Pico-second time alignment is an enabler in cooperative use of spectrum in various contexts. For example, such functionality may be used in communications, electronic warfare, and the like. For example, this may be used in cooperative jamming or the swarm array backhauls 102 (illustrated as part of a satellite) and 104 (illustrated as part of an airplane) shown in FIG. 1 below. Although <10 ps accuracy has been achieved in the literature—an accuracy adequate for low GHz carrier frequencies—state of the art alignment waveforms are inherently detectable and can be targeted by enemy firepower or other physical or hacking attacks. Embodiments illustrated herein can achieve timing alignment with a low probability detection (LPD) or low probability intercept (LPI) waveform to remove this vulnerability. Overcoming lower SNR signaling, embodiments can achieve state of the art timing accuracy while still facilitating LPD or LPI signals.

Some embodiments solve various technical challenges. For example, re-use of the communication waveform for time sync may require removal of unknown communication bits prior to time sync estimation. Note that known values are, for example, pilots and headers. Unknown are the information data stream, possibly including meta-data such as timing messages. Note that unknown bits in the data stream can be reliably treated as known bits if FEC decoding completes with satisfied parity measures. Additionally or alternatively, use of a continuous, LPD waveform may lead to temporal and frequency overlap and CDMA interference to mitigate. Alternatively or additionally, true LPD operations, may include an SNR which may be 10 s of dBs below zero.

Some embodiments include turbo synchronization or decision-directed synchronization. For example, demodulated and possibly forward error correction (FEC)-decoded bits can be fed back to a synchronization block to augment known header symbols with data symbol energy to enhance integrated SNR as considered in greater detail in the discussion of FIG. 5 below. Embodiments may alternatively or additionally modify the transmit waveform to temporally link transitions in the carrier frequency and chipped bit stream to allow for coherent combination of multiple data modulated chips to be used in time synchronization.

The following now illustrates various technical details.

Coherent combining of signals often requires that carrier signals arrive aligned to within one tenth of the carrier period, e.g., 100 ps for a 1 GHz carrier frequency. While previously implemented methods exist to achieve this, those methods rely on high-SNR, bursted side channels and would counteract the effectiveness of concealing a continuous LPD waveform by making the side channels detectable revealing the presence of transmitters. To remain covert, LPD signals generally operate at much lower SNRs—often 20-30 dB lower—than other systems, but their substantial continuity can be exploited to significant advantage. In particular, substantially continuous signals are more difficult to detect as compared to bursted signals. Indeed, in some embodiments, such continuous signals are substantially impossible to detect.

Figure 3:
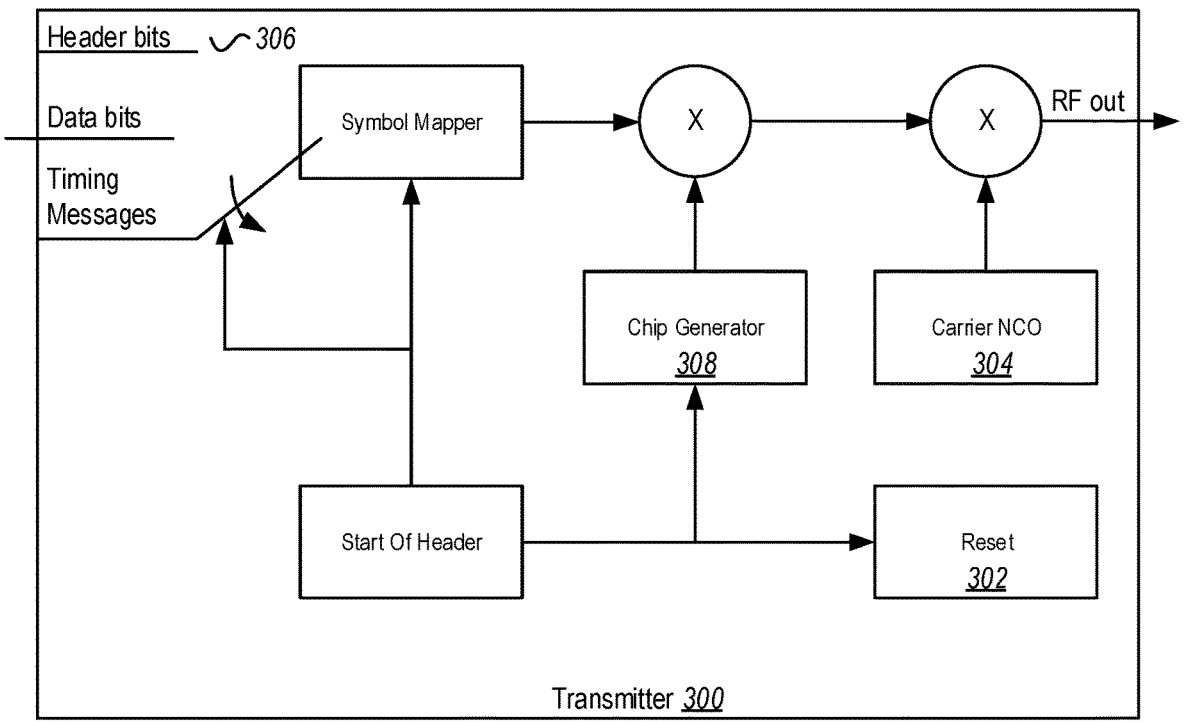
FIG. 3 illustrates a transmitter configured to correlate phases of carrier signals and data signals.
Figure 4:
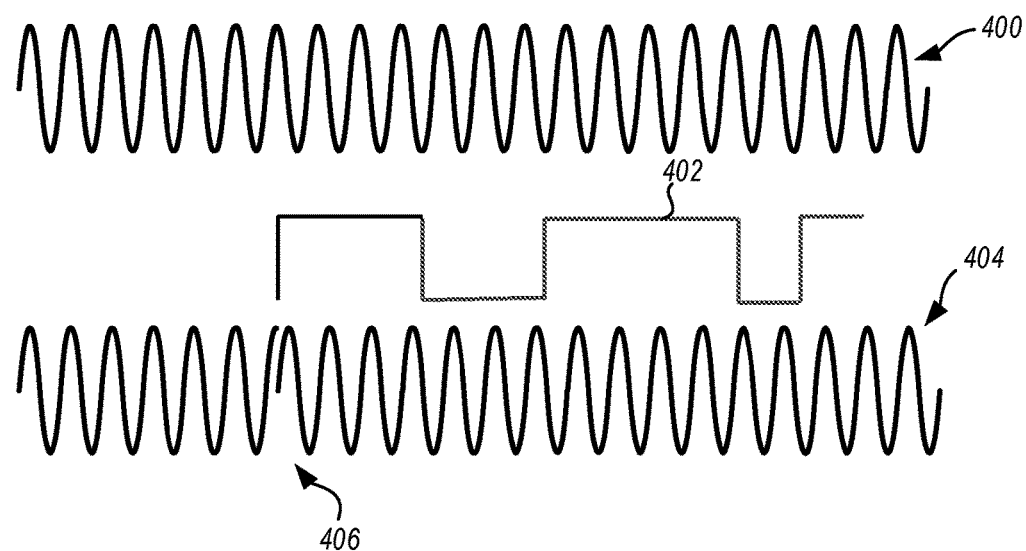
FIG. 4 illustrates components of a data signal and a carrier signal correlated by correlating the phases of the data signal and carrier signal.

For example, some embodiments use a DSSS waveform on ~1 GHz carrier frequency via direct IF/RF synthesis and sampling. This allows embodiments to avoid phase ambiguity in analog up/down conversion. For example, with reference to FIG. 3, some embodiments, in a transmitter 300 activate a reset circuit 302 which resets an up-conversion carrier numerically controlled oscillator (NCO) 304 at the beginning of the acquisition header (shown as header bits 306 of the waveform) and integrate across many chips to achieve a required measurement SNR. The infrequent reset, which causes a discontinuity in the carrier signal that is reset (as seen in FIG. 4 at 406), of the carrier NCO 304 is predictable and easily accommodated in the receiver tracking loop of the receiver 500.

In some embodiments, initial (coarse) acquisition by the receiver 500 relies on correlation against the known acquisition header at two samples/chip and closure of a phase-locked loop (PLL) timing loop with ~5% loop bandwidth. This achieves timing alignment to within 1 ns (in the present example), or one carrier cycle. Refined alignment is then achieved by integrating up 1 k, 10 k or 100 k symbols (or some other appropriate number of symbols)—trading SNR vs. tracking bandwidth—and re-correlating against reference samples from a pristine transmit sequence at RF. Examples of this are illustrated in U.S. Pat. No. 9,219,600 titled Synchronization Through Waveform Correlation issued on Dec. 22, 2015, which is incorporated herein by reference in its entirety.

Figure 2:
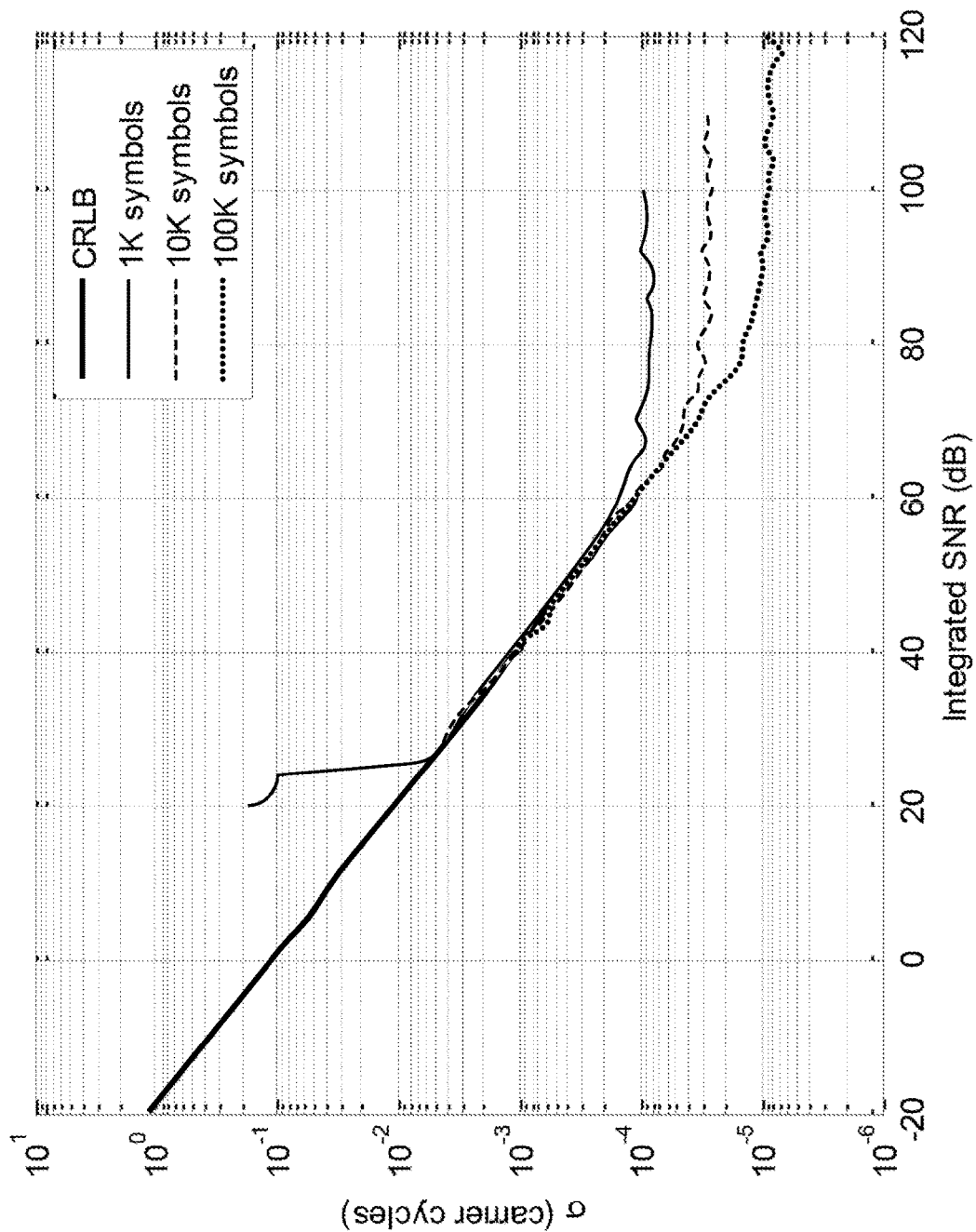
FIG. 2 illustrates various SNR performance characteristics for various embodiments.

FIG. 2 highlights performance metrics for some embodiments. For an integrated SNR of 30 dB to 60 dB, embodiments can essentially reach the Cramer-Rao bound. Embodiments can achieve a timing accuracy of 4e-3*Tc=4e-3/1 GHz=4 ps with an integrated SNR of 30 dB. Starting with an input $E_{chip}/N_0$=-20 dB, a common operating point for LPD waveforms used in enemy territory. Some embodiments achieve this SNR by accumulating 100 k chips (50dB) at a 100 Mchip/s rate. In some embodiments, this is achieved using at least a 1 ms integration dwell time. Thus, FIG. 2 illustrates that correlation against an LPD, continuous waveform reference achieves the CRLB performance and better than Tc*10-3 timing accuracy (4 ps at 1 GHz) for a pre-integration SNR of -20 dB and 100 k chips of integration (50 dB).

Support of this functionality can be implemented in new, improved transmit and receive systems. In particular, an improved system can be implemented which is less detectable and/or attackable as compared to existing systems. An improved transmit portion of the system is illustrated in FIG. 3. FIG. 3 illustrates a transmitter that includes an NCO reset circuit 302 to keep header and carrier phase aligned. Timing messages may already be exchanged but the NCO reset circuit 302 enables refined phasing (by, for example, facilitating injection of a reset of the carrier signal to a particular phase, such as for example, 0°, over chip-only timing estimates. In this way, a data signal can have a known phase of the data signal correlated to the reset phase. Thus, for example, a reset of the carrier phase may be performed to correlate the start of a header bit with the reset phase of the carrier signal.

FIG. 4 illustrates an example of the effects of this reset functionality on a communication signal. FIG. 4 illustrates components of a communication signal including a data signal 402 and a carrier signal 404. Embodiments may include functionality for correlating a phase of the data signal 402 with a phase of the carrier signal 404.

In some embodiments, such as that illustrated in FIGS. 3 and 4, this is accomplished by resetting the phase of the carrier signal 404 at the beginning of a data sequence in the data signal 402. Thus, as illustrated at 406, a reset of the carrier signal 404 occurs resulting in a phase discontinuity of the carrier signal. If the value of this phase discontinuity is known (e.g., how many degrees the phase is shifted in the carrier signal and/or the phase angle of the discontinuity) it can be used at a receiver to recover timing information from a substantially continuous LPD waveform, even without separate timing information such as a separate timing channel, and in some embodiments even without separate sync words in the data signal 402.

Note that while the example illustrated in FIG. 4 illustrates that the phase of the carrier signal is reset to 0 degrees, in other embodiments, the phase can be set to some other known value. So long as the receiver 500 has this value, embodiments can be effectively implemented.

Note that to achieve this phase matching by carrier reset, in some embodiments, the carrier signal 404 produced by the carrier NCO 304 is a digitally synthesized signal. Similarly, the signal produced by the chip generator 308 is a digital signal. This allows for easier correlation of the data signal 402 with the carrier signal 404.

Note that several of the components illustrated in FIG. 3 may be optional. For example, the chip generator 308 is an optional component. Instead, embodiments may be implemented where any suitable digital signal is phase correlated with a carrier signal produced by the carrier NCO 304.

Additionally or alternatively, header information and/or timing bits can be excluded from the data signal 402. Such header information and/or timing bits may contain known data that can be used for synchronization and correlation in some embodiments, but can be excluded when other modalities are used for synchronization and correlation. For example, if SNR is sufficiently high, effective forward error correction coding is used, or other highly effective methods of decoding data (i.e., methods that are able to extract data with error rates below some predetermined value), then the decoded data can be used for comparison when performing synchronization and correlation. For example, either header information or accurately extracted payload data can be used for synchronization and correlation in a receiver using, for example, the modalities described in U.S. Pat. No. 9,219,600 titled Synchronization Through Waveform Correlation issued on Dec. 22, 2015, which is incorporated herein by reference in its entirety.

Figure 5:
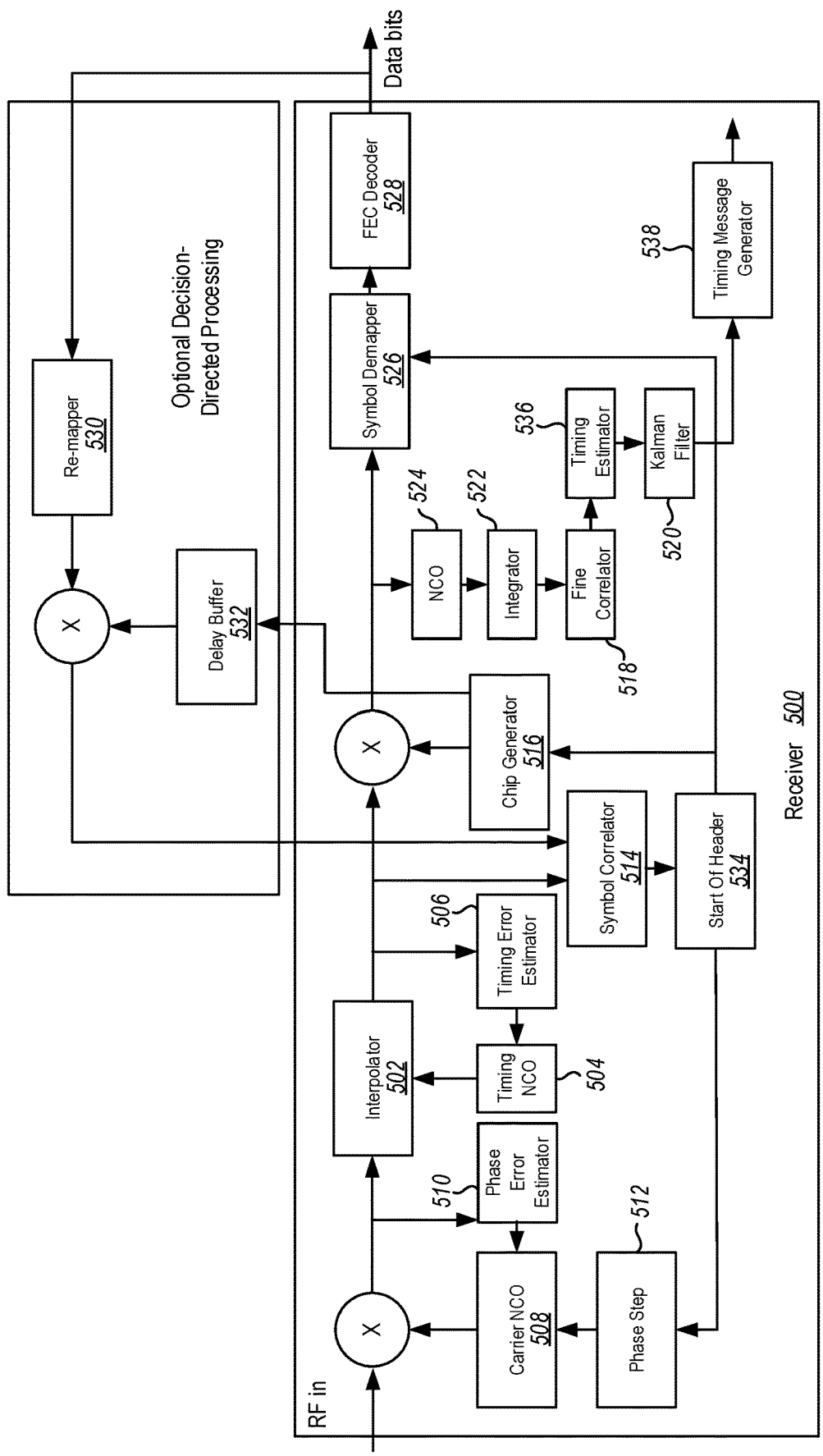
FIG. 5 illustrates a receiver configured to decode a carrier signal carrying a data signal where the carrier signal and the data signal have correlated phases.

FIG. 5 illustrates details of a receiver 500. The receiver 500 includes functionality for exchanging timing alignment messages with the transmitter 300.

The particular example includes an interpolator 502. The interpolator 502 interpolates (by weighting) samples from an input signal to attempt to obtain accurate interpolations of samples. For example, a sample may occur at a suboptimal time offset within the match-filtered signal, resulting in an inaccurate detection of the transmitted information bit(s). The interpolator 502 uses timing information from a timing NCO 504 and a timing error estimator 506 to adjust the weighting applied to the input samples.

FIG. 5 further illustrates a carrier NCO 508, which receives input from a phase error estimator 510 and a phase step generator 512. The phase error estimator 510 examines an incoming RF signal and attempts to identify phase offsets (complex mis-rotations) or frequency offsets of the incoming signal. Such offsets can be unambiguously identified for known pilot or header symbols, providing phase or frequency estimates generally valid for nearby unknown data symbols; or, such offsets can be identified relative to a finite alphabet of expected receive symbols, though some ambiguity will remain for symmetric symbol alphabets. The phase step generator 512 provides input related to phase correlation of data signals and carrier signals. As noted previously, often the phase is correlated based on the start of a header or other known (or identifiable) data sequence. Thus, the phase step generator 512 receives input from a symbol correlator 514 which correlates input signals with a known data sequence, which known data may be a sync word stored at the receiver 500, previously unknown data extracted from the input signal, etc.

FIG. 5 illustrates a chip generator 516. Note that the chip generator 516 is used for a particular embodiment, and is not required for all embodiments. The chip generator can be used to generate de-spreading chips in DSSS waveforms. If a waveform is not encoded as a DSSS waveform, then the chip generator 516 is not needed.

The receiver 500 further includes a fine phase correlator 518 and tracking filter 520 (which in the illustrated example, is illustrated as a Kalman Filter).

The receiver 500 further includes a phase step 512 to track through transmit side phase resets at the start of the header, an integrator 522 to increase SNR with NCO 524 to keep integrands coherent. Timing messages received at the receiver 500 can benefit from refined inputs.

Turbo synchronization is identified in the optional decision-directed processing block 524. The demapper 526 converts complex-value symbols into corresponding bits or log-likelihood ratios as used by soft-input decoders. The FEC decoder 528 uses redundancy in the transmit data stream to estimate the input bit stream most likely to have generated the received signal. The re-mapper 530 reconstructs a noise free estimate of the complex valued symbols of this likeliest transmit stream. Together with a delayed version of the chip sequence presented at the output of the delay buffer 532, a better—yet somewhat delayed—correlation with the input stream can be computed for a lower-noise estimate of the start of header. The start of header block 534 creates a strobe signal indicating proper alignment of various data streams used in various estimations. The coarse timing estimate is augmented by a fine correlator 518, and may be further refined via interpolation, curve-fitting, zero-crossing, or other refined timing estimation techniques in the timing estimator block 536. Kalman or otherwise filtered outputs can then be packaged into a message format appropriate for sharing with other sub-systems or systems of communications participants in the timing message generator block.

Some embodiments may include optimizations in at least one of the size or frequency of headers in the data signal 402. For example, these may be determined based on engineering considerations to balance the conflicting goal of increased integration times (SNR) vs. the time varying aspects of oscillator alignment as a function of oscillator drift and/or platform dynamics.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
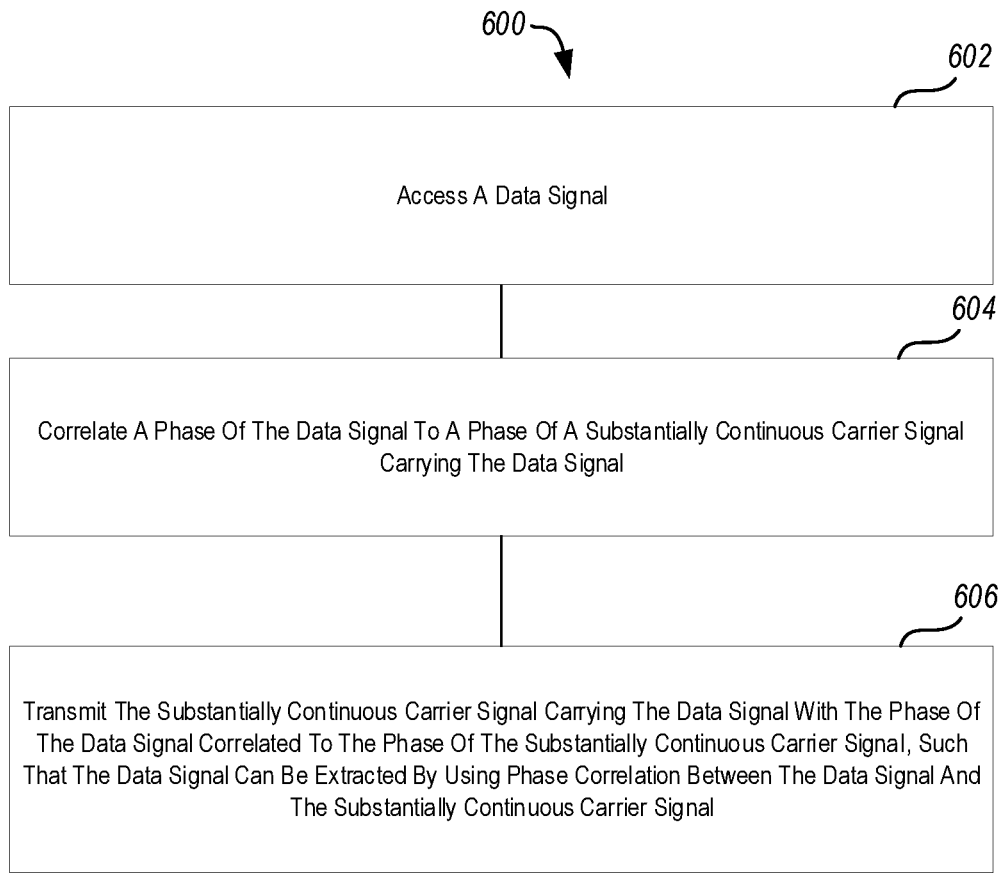
FIG. 6 illustrates a method of transmitting a signal in a way to mask the presence of the signal or to reduce the ability of external entities to extract data from the signal.

Referring now to FIG. 6, a method 600 is illustrated. The method 600 includes acts for transmitting a signal in a way to mask the presence of the signal or to reduce the ability of external entities to extract data from the signal. In particular, embodiments of the method 600 include the ability to transmit low probability detection/intercept signals. The method 600 includes accessing a data signal (act 602). For example, a transmitter device may access the data signal 402. This may be accomplished, for example, by the transmitter generating the signal, receiving the signal from another entity, or in any other appropriate fashion.

The method 600 further includes correlating a phase of the data signal to a phase of a substantially continuous carrier signal carrying the data signal (act 604). For example, as illustrated in FIG. 4, the carrier signal 404 has a phase that is correlated to the data signal 402. In the example illustrated in FIG. 4, this is accomplished by resetting the phase of the carrier signal 404 as illustrated at 406. In this particular example, the phase is reset to 180°.

The method 600 further includes transmitting the substantially continuous carrier signal carrying the data signal with the phase of the data signal correlated to the phase of the substantially continuous carrier signal, such that the data signal can be extracted by using phase correlation between the data signal and the substantially continuous carrier signal (act 606). For example, the carrier signal 400 may be reset using the data signal 402 to form the modified carrier 404 with the artifact illustrated at 406 such that the data signal 402 has a phase that is correlated to a phase of the carrier signal 404. The carrier signal can then be modulated using the data signal and the modulated carrier signal (not shown) can be transmitted using various transmission techniques such as wired or wireless data transmission.

The method 600 may be performed where the carrier signal is substantially continuous based on the carrier signal's characteristics meeting a pre-determined threshold.

For example, in some embodiments the pre-determined threshold comprises a percentage of the carrier signal that is actively modulated. For example, some embodiments may require that the carrier signal 404 is actively modulated 90% of the time. Active modulation means that the carrier signal is changing. Such change may be the natural result of a continuous sine wave without necessarily needing to be additionally modulated by the data signal 402. Indeed, often the data signal 402 is only a short burst of data and will not be used to actively modulate the carrier signal 404. Thus, as used herein, active modulation meeting a predetermined threshold could be a modulated sine wave that is not additionally modulated with data. Note that the active modulation is not necessarily required to be continuous. Thus, for example, if the requirement is that the carrier wave 404 be actively modulated for 90% of the time, that requirement may be met by aggregating all of the periods of active modulation of the carrier signal 404.

Alternatively or additionally, the pre-determined threshold comprises an amount of the carrier signal that is transmitted without interruption. In this example, embodiments may require that carrier signal 404 be actively modulated for a certain amount of time without interruption. And, in some embodiments, said amount of time may be arbitrarily long.

The method 600 may be practiced where the carrier signal is substantially continuous based on the data signal's detectability being below a pre-determined threshold. For example, if certain detection techniques are unable to detect the presence of the carrier signal 404, due to the continuous nature of the carrier signal, then the carrier signal may be considered to be substantially continuous.

The method 600 may be practiced where the carrier signal is substantially continuous based on the carrier signal's ability to perform charging or integration functions being above a pre-determined threshold. For example, in some embodiments, the carrier signal 404 may be additionally used to charge a circuit. That circuit may experience current draw from the circuit which causes the power circuit to discharge. In some embodiments, if the carrier signal 404 is able to keep the circuit charged, in spite of efforts to discharge the circuit, then the carrier signal 404 will be considered substantially continuous.

As illustrated above, the method 600 may be practiced where correlating a phase of the data signal to a phase of a substantially continuous carrier signal carrying the data signal comprises adding a phase discontinuity to the substantially continuous carrier signal as a result of resetting the substantially continuous carrier signal phase at a particular time such that a reset point of the substantially continuous carrier signal resets the carrier signal to a known phase corresponding to a known phase of the data signal. This example is illustrated in FIG. 4 where the phase of the carrier signal 404 is reset to correlate to the phase of the data signal 402 causing an artifact as illustrated at 406.

Figure 7:
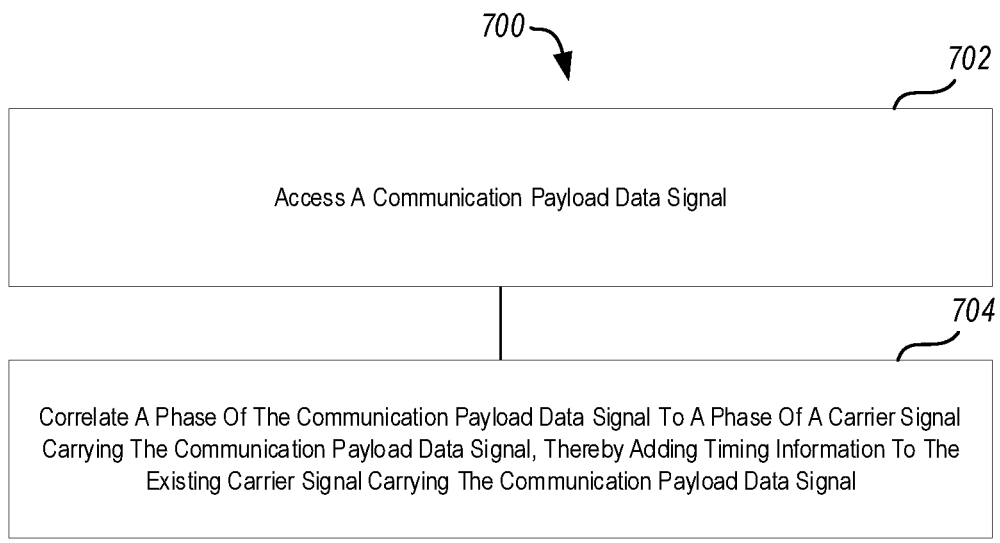
FIG. 7 illustrates an alternative method of transmitting a signal in a way to mask the presence of the signal or to reduce the ability of external entities to extract data from the signal.

Referring now to FIG. 7, a method 700 is illustrated. The method 700 includes acts for transmitting a signal in way to mask the presence of the signal or to reduce the ability of external entities to extract data from the signal. For example, the signal may be sent as a low probability detection/intercept signal. The method includes accessing a communication payload data signal (702). As illustrated previously, a transmitter may access the data signal 402. This may be accomplished by the transmitter generating the data signal 402, the transmitter receiving the data signal 402 from another entity, or through some other appropriate modality.

The method further includes correlating a phase of the communication payload data signal to a phase of a carrier signal carrying the communication payload data signal, thereby adding timing information to the existing carrier signal carrying the communication payload data signal (act 704). For example, FIG. 4 illustrates at 406 that an anomaly is added to the carrier signal 404 to correlate the phase of the carrier signal 404 with the data signal 402. Thus, the method 700 may be practiced where correlating a phase of the communication payload data signal to a phase of a carrier signal carrying the communication payload data signal comprises adding a phase discontinuity as a result of resetting the carrier signal phase at a particular time.

The method 700 may be practiced where correlating a phase of the communication payload data signal to a phase of a carrier signal carrying the communication payload data signal obviates a need for a separate timing channel. Rather, timing information is included in the correlation of phase.

Figure 8:
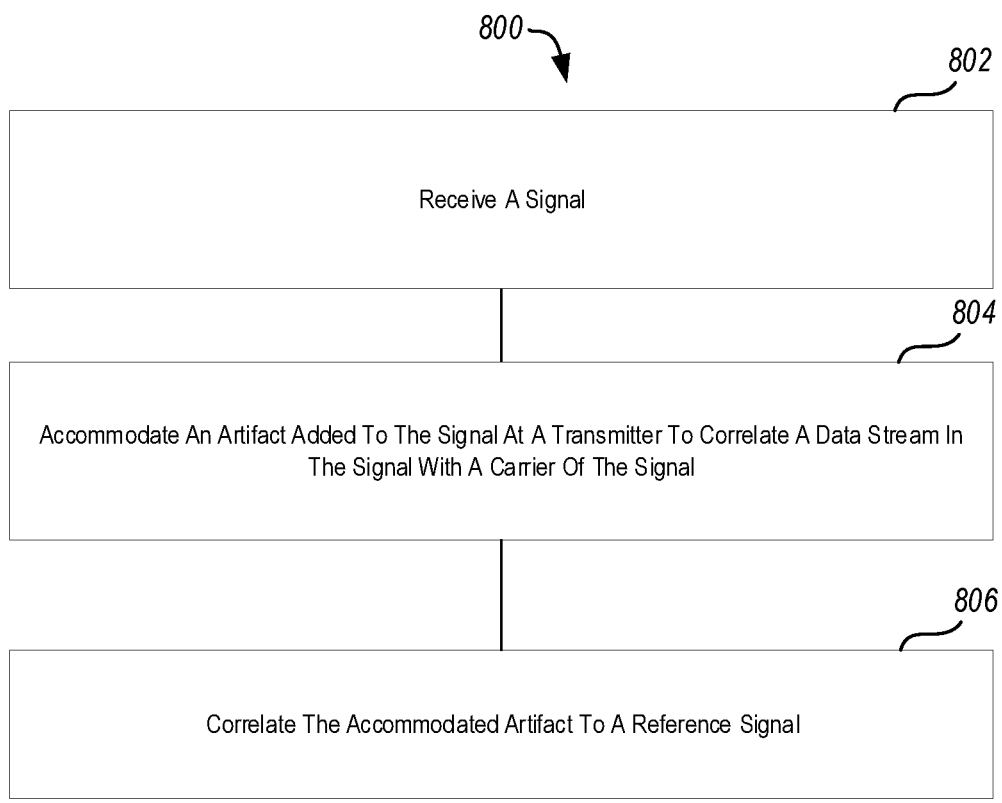
FIG. 8 illustrates a method of extracting time alignment from a received signal.

Referring now to FIG. 8, a method 800 is illustrated. The method 800 includes acts for extracting time alignment from a received signal. The method includes receiving a signal (act 802). For example, a carrier signal modulated by a data signal received. For example, such a signal may be received at the receiver 500 illustrated in FIG. 5.

The method 800 further includes accommodating an artifact added to the signal at a transmitter to correlate a data stream in the signal with a carrier of the signal (act 804). For example, as illustrated in FIG. 4, an artifact, such as a phase reset as illustrated at 406 in the carrier signal 404 may be accommodated by the receiver in that the receiver includes functionality for not treating the artifact as an error, but rather uses the artifact for useful purposes.

The method 800 further includes correlating the accommodated artifact to a reference signal (act 806). For example, the receiver 500 may store a reference signal, such as a code word used for timing. Alternatively or additionally, as will be illustrated in more detail below, receiver 500 may include functionality for extracting a reference signal from a received signal which can be used for recovering timing information. Thus, in some embodiments, the artifact may be used to identify in a received signal start of a code word or other extracted data sequence which can then be compared to a reference signal to perform certain timing functions.

As discussed above, the method 800 may be performed where the artifact is a phase discontinuity.

The method 800 may be performed where accommodating is performed in a fashion to accomplish sub-carrier cycle alignment.

The method 800 may be performed where the method is practiced as preprocessing input into a filter. For example, as illustrated in FIG. 5, processing to accomplish method 800 is performed as preprocessing input into the Kalman filter 520.

The method 800 may be performed where correlating the accommodated artifact to a reference signal comprises correlating the accommodated signal to a sync word. In particular, a sync word is a known string of characters that can be used to indicate timing information. Sync words can be known to the receiver 500 and can also be used to modulate a carrier signal. Thus, in some embodiments, the artifact illustrated at 406 in FIG. 4 may be correlated to a single word such that the data signal 402 illustrated in FIG. 4 is the sync word which has its phase correlated to the phase of the carrier signal 404 by introducing the artifact illustrated at 406.

The method 800 may be performed where correlating the accommodated artifact to a reference signal comprises correlating the accommodated artifact to previously unknown data extracted from the data stream. For example, some embodiments may be implemented where data symbols are extracted from a received signal and the extracted data symbols comprise a reference signal. That extracted reference signal may be correlated to an artifact in a received signal where the artifact is used to correlate the phase of the extracted reference signal with a carrier signal encoded with the reference signal.

The method 800 may be performed where the unknown data is extracted using a method that causes the error rate of extraction of the unknown data to be below a predetermined threshold.

The method 800 may be performed where the unknown data is extracted using a signal with an SNR sufficiently high to cause the error rate of extraction of the unknown data to be below a predetermined threshold.

The method 800 may be performed where the unknown data is extracted using a signal with error correction to cause the error rate of extraction of the unknown data to be below a predetermined threshold.

Some embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of transmitting a signal in a way to mask the presence of the signal or to reduce the ability of external entities to extract data from the signal, the method comprising:
   accessing a data signal;
   correlating a phase of the data signal to a phase of a carrier signal carrying the data signal; and
   transmitting the carrier signal carrying the data signal with the phase of the data signal correlated to the phase of the carrier signal, such that the data signal can be extracted by using phase correlation between the data signal and the carrier signal.

2. The method of claim 1, wherein the carrier signal meets a pre-determined threshold.

3. The method of claim 2, wherein the pre-determined threshold comprises a percentage of the carrier signal that is actively modulated.

4. The method of claim 2, wherein the pre-determined threshold comprises an amount of the carrier signal that is transmitted without interruption.

5. The method of claim 1, wherein the data signal's detectability is below a pre-determined threshold.

6. The method of claim 1, wherein the carrier signal comprises an ability to perform charging or integrating functions being above a pre-determined threshold.

7. The method of claim 1, wherein correlating a phase of the data signal to a phase of a carrier signal carrying the data signal comprises adding a phase discontinuity to the carrier signal as a result of resetting the carrier signal phase at a particular time such that a reset point of the carrier signal resets the carrier signal to a known phase corresponding to a known phase of the data signal.

8. A method of transmitting a signal in way to mask the presence of the signal or to reduce the ability of external entities to extract data from the signal, the method comprising:

accessing a communication payload data signal; and correlating a phase of the communication payload data signal to a phase of a carrier signal carrying the communication payload data signal, thereby adding timing information to the existing carrier signal carrying the communication payload data signal.

9. The method of claim 8, wherein correlating a phase of the communication payload data signal to a phase of a carrier signal carrying the communication payload data signal obviates a need for a separate timing channel.

10. The method of claim 8, wherein correlating a phase of the communication payload data signal to a phase of a carrier signal carrying the communication payload data signal comprises adding a phase discontinuity as a result of resetting the carrier signal phase at a particular time.

11. A method of extracting time alignment from a received signal, the method comprising:

receiving a signal;

accommodating an artifact added to the signal at a transmitter to correlate a data stream in the signal with a carrier of the signal; and correlating the accommodated artifact to a reference signal.

12. The method of claim 11, wherein the artifact is a phase discontinuity.

13. The method of claim 11, wherein accommodating is performed in a fashion to accomplish sub-carrier cycle alignment.

14. The method of claim 11, wherein the method is practiced as preprocessing input into a filter.

15. The method of claim 14, wherein the filter is a Kalman filter.

16. The method of claim 11, wherein correlating the accommodated artifact to a reference signal comprises correlating the accommodated signal to a sync word.

17. The method of claim 11, wherein correlating the accommodated artifact to a reference signal comprises correlating the accommodated artifact to previously unknown data extracted from the data stream.

18. The method of claim 17, wherein the unknown data is extracted using a method that causes the error rate of extraction of the unknown data to be below a predetermined threshold.

19. The method of claim 17, wherein the unknown data is extracted using a signal with an SNR sufficiently high to cause the error rate of extraction of the unknown data to be below a predetermined threshold.

20. The method of claim 17, wherein the unknown data is extracted using a signal with error correction to cause the error rate of extraction of the unknown data to be below a predetermined threshold.

* * * * *